Sept. 22, 1959 — C. L. DE PRIESTER — 2,905,245
LINER PACKING METHOD
Filed June 5, 1957 — 4 Sheets-Sheet 1

INVENTOR
CORAL L. DE PRIESTER
BY
ATTORNEYS

United States Patent Office 2,905,245
Patented Sept. 22, 1959

2,905,245

LINER PACKING METHOD

Coral L. De Priester, Fullerton, Calif., assignor to California Research Corporation, San Francisco, Calif., a corporation of Delaware Application June 5, 1957, Serial No. 663,826

8 Claims. (Cl. 166—15)

The present invention relates to an improved method of completing wells such as those that produce oil, gas and water, to prevent the movement of sand particles from the earth formation that contains such fluids. More particularly, the invention relates to an improved method of sand packing the space between a perforated liner or well screen and the walls of a well bore penetrating an unconsolidated earth formation containing sand, silt and clay.

It is an object of the present invention to provide an improved method of packing the annular space between a liner and an unconsolidated sand formation containing a fluid by positioning a widely-graded sand pack having a distribution of sand particles substantially similar to the size distribution of particles in the formation, but each portion of the distributed pack having a diameter several times the diameter of the particles in the original formation to which it corresponds. The well completion sand is carefully selected for said distribution of sizes and then well mixed before insertion in the well bore; it is maintained in a well-mixed state so that the fluid pressure drop under flowing fluid conditions is at all places, in both the sand formation and sand pack, at a value that prevents accelerating and decelerating flow conditions from displacing the fine silt and clay particles intermixed with the larger sand particles in the formation.

One of the most perplexing problems in producing oil and gas from a sand formation that is loosely consolidated is how to prevent sand from running into the well bore under normal fluid flow conditions. In many areas, sand formations containing oil, gas, water, and mixtures thereof, contain an adequate binder to prevent movement of the sand particles. However, in areas such as the San Joaquin Valley in California and the Gulf Coast area of Louisiana, producing sands are frequently encountered that contain little or no binding material. It has been believed heretofore that if the silt and clay particles, normally present with the quartz particles forming the sand, are permitted to flow out of the formation with the fluid under production, that the flowing sand particles can be stabilized by a phenomena known as "bridging." "Bridging" is the name applied to the process of building a stable structure of solid particles on an opening several times the diameter of the particles that might be expected to flow through the opening. Among the previously suggested solutions for this problem, has been the use of sand and gravel particles that are selected to have a relatively uniform diameter several times the diameter of some particular point on the cumulative size distribution of the sand particles in the original earth formation, for example, the diameter that would retain 10 or 50% by weight of the sample of earth formation. Other suggestions have included the use of annular or horizontal grading of discrete and sectionally uniform sizes of sand or gravel having various relations compared to the size of the formation particles.

Another field practice for controlling sand flow has included using a liner or screen with relatively small openings so that even fine sand cannot flow through. This method greatly reduces the permeability of the well system for fluid flow and thus also drastically reduces the potential productivity of the well.

None of the previously proposed solutions discussed has been successful in actually preventing sand production from formations that are not consolidated, or only slightly so while maintaining maximum flow conditions for the well. Under producing conditions, the pressure in the well bore is usually lowered several hundred pounds below that of fluid in the formation. Thus, there is a drop in pressure throughout that portion of the formation behind the well bore wall, as well as through the portion of a sand or gravel pack between the inside of the liner and well bore wall. I have found that the sand particles can be restrained from flowing with the produced fluids, in such unconsolidated formations, by making this large pressure drop substantially uniform through any given space between the wall of the earth formation and the production screen, or liner.

Contrary to previous practice, I have found that this uniform pressure drop through the entire flow path can be best achieved by holding the individual particles, and especially the minute silt and clay elements, in intimate contact with sand in the original formation. These particles must be undisturbed during flow if successful control of the larger grains of sand is to be achieved. Accordingly, the sand must be selected and packed not only to prevent gross movement of the formation, but also so that the finer sand particles, and the cementing silt and clay particles are undisturbed by fluid flow through both the formation and sand pack. I have found that control of these sand particles can be had by grading the pack sand throughout a range of sizes having a certain relationship to the sizes of the particles that are in the formation itself. As mentioned above, packing of the same material as that forming the bore wall would form an adequate barrier to the flow of the formation particles, but the diameter of area of the liner openings must be made small to control flow of the solid particles and other matter forming the earth formation. These dimensions are normally so low in unconsolidated formations that the permeability of the entire formation, pack and liner is too low for economical well flow or pumping.

In accordance with the present invention, movement of the cementing materials, such as silt, clay and the finer sand particles out of the earth formation is prevented by first analyzing the proportion by weight of each size of particle in said formation. Such information is obtained by coring, side wall sampling, bailing formation material that has sloughed into the hole, or even by the analysis of the drilling fluid returns from the proper horizon. This analysis is done most conveniently by using the Tyler screen method. In said method the sample is shaken through a series of successively smaller screen sizes and the weight of the material that is retained on each screen is calculated as percent by weight of the total sample. These data are conveniently plotted as cumulative weight percent retained on each successively smaller screen. Also for convenience, these data are normally plotted on a semi-log scale. In the present method, desirably at least several values of said cumulative sand size distribution are determined in the formation, namely about the 10 percentile (i.e., screen opening that would retain 10% by weight of the particles in the formation; also particle diameter), 50 percentile and 90 percentile.

There is then selected a mixture of sands for the sand pack containing a gradation in sand sizes such that the ratio between the 10 percentile diameter and the 90 percentile diameter of the pack sand has a value of at least 3; the 50 percentile diameter of the sand used in the pack is in the range of from 1 to 8 times the diameter of the formation sand at the 50 percentile value. Additionally, the pack sand 90 percentile value should not be greater than 12 times the diameter of the formation sand at the 90 percentile. After determining the range of sizes for the pack sand mixture, the sand from any convenient source is obtained in amounts of various sizes in the indicated size range such that when all are mixed or blended together in a homogeneous mixture the cumulative size distribution will meet the specifications determined from the formation size analysis.

With the pack sand selected and mixed in accordance with the foregoing, it is then positioned between a liner set in the well opposite the formation whose sand flow is to be controlled. The pack sand is desirably hydraulically rammed under pressure in the annular space between the walls of the well bore and the liner. The liner may be pre-slotted with a series of openings proportioned in size and in proper relation to the size distribution of the sand pack, such that the pack sand will not flow through the liner openings. Desirably, said size is not larger than the 10 percentile diameter of the pack sand. In general it is undesirable to use liner openings smaller than about 0.030 inch because small liner openings plug easily, and maximum area should be maintained to provide maximum productivity. Further, the total number of slots or other openings is made a maximum to give maximum cross-sectional area for fluid flow throughout the circumference of the liner. Alternatively, a wire wrapped screen liner, a liner using drilled holes, or any other type liner can be used provided that the liner openings are each proportioned to the sand pack size distribution in the same manner described above.

In the foregoing discussion, the term "sand" has been used to denote one common and usually the most economical material for packing the space between an earth formation and a well bore liner. It will be understood that other particulate materials can be graded and mixed in precisely the same manner. For example, pure crushed quartz, ground glass, beads, walnut shells or other hard natural and manufactured particulate materials can be graded and mixed to form the pack. The same method of selecting and mixing of such other particulate materials may be preferred due to weight and cost of shipping where sand is not readily available in a sufficiently wide variation of sizes. Hence, the term "sand" will be understood to include such other particulate materials for packing an earth formation to yield maximum fluid productivity without disturbing the earth formation's natural binding agents.

Desirably, but not necessarily, the well is treated before sand packing by positioning in the well a well drilling or treating fluid which is known to result in a minimum amount of formation plugging or filter cake deposition on the well bore wall. Where the well is to be re-completed and then sand packed, preferably the well bore is underreamed to enlarge the opening and expose a clean face that is substantially undamaged by previous flow or disturbance of the fine silt, clay, and sand particles. A sand pack proportioned to the formation sands is then pumped into the annular space between the newly cut formation face and the well liner by suspending the pack particles in a fluid vehicle, such as saturated brine, hydrocarbon material, or other sand carrying fluid under conditions of pump capacity, flow velocity of the slurry in a conduit down the well bore and mechanical arrangement of the well bore equipment such that no significant amount of size classification of the pack sand can take place.

Further objects and advantages of the present invention will become apparent from the following detailed description taken in conjunction with the accompanying drawings.

As discussed hereinabove, the present method permits the packing of an unconsolidated sand formation, such as that illustrated in Fig. 1 as formation 10, that has been penetrated by a well bore 11 during drilling, or which has been on production as a fluid-producing well. As indicated by the irregularity of well bore 11, the unconsolidated sand particles, whihc include sand fines, as well as clay and silt, are disturbed by normal rotary drilling techniques and are subject to movement when a high pressure drop appears at the interface between the well bore and the formation.

Since it is necessary to maintain a pressure-differential of several hundred pounds, say 600 pounds per square inch between the well and the body of the sand formation to induce economic flow of fluids into the well, there is accordingly a high pressure differential between individual grains of sand forming the bulk of the formation. As mentioned above it has been common practice heretofore to pack the formation with a large diameter sand with the expectation that the packed particles will cause bridging or eleiminate motion of the sand particles in the sand formation. Unfortunately, the smaller particles move out of the original formation and through a relatively large diameter pack unless, or until, bridging occurs. If bridging does not occur, the well may fill with sand, pump valves may be eroded, or other troubles from said production will result. If formation particles bridge on the large diameter pack, fine sands will deposit in the bridging structure and in lower velocity zones within the packing material itself. Such build up causes plugging of the pack around the well bore and productivity of the well may be drastically reduced. If bridging does not occur early in the producing life of the well, movement of formation particles allows massive shifts of the remaining formation. This action sometimes causes collapse of the liner which necessitates an expensive job of redrilling and recompleting the well. Sand in the well bore reduces the productivity of the well so that it is difficult if not impossible, to produce fluid through the well bore without continual bailing or desanding operations.

As mentioned hereinabove, I have discovered that movement of even the very fine particles in the original earth formation can be avoided, so that problems of plugging the well bore and liner are reduced to a great extent and sanding up entirely eliminated. However, the sand content of earth formations and the grain-size distribution in each field, and frequently in each well, vary widely, depending upon many unknown factors relating to the original deposition conditions when the sand formation was laid down. Accordingly, it is necessary to determine the range of particle sizes in the original formation.

Figure 2:
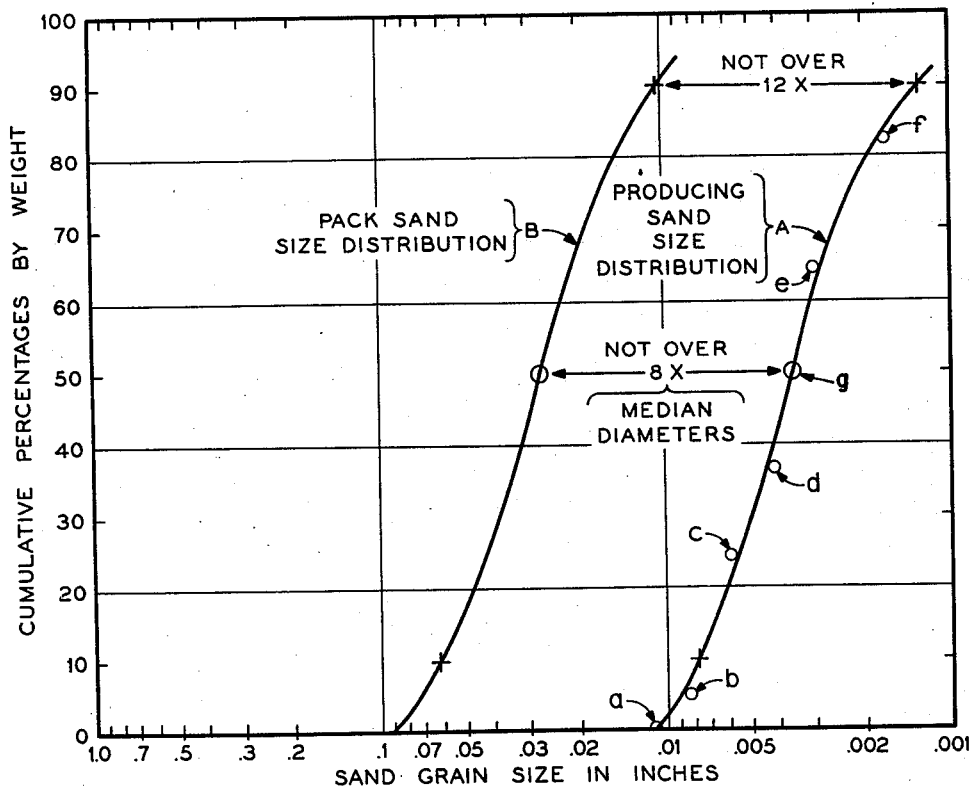
Fig. 2 is a logarithmic plot of the Tyler mesh analysis, on a cumulative percentage by weight, diagram illustrating the method of representing formation sand-size distribution and the preferred manner of selecting the size distribution for sand packing.

In the present case, this range of formation particle size is measured and then desirably plotted in the manner illustrated in Fig. 2. As there shown, several discrete measurements are made of the cumulative percentage by weight (percentile) of samples taken from the well bore by coring, side wall sampling, or bailing. Each sample is measured by successively passing it through a series of Tyler screens. As indicated, the points $a$, $b$, $c$, $d$, $e$, $f$ are plotted on the logarithmic scale of mesh size openings; the curve A is then drawn through these points, as well as any intermediate points taken. There is thus established a range of the sizes and the distribution thereof in the formation itself. From this curve, extending continuously from the 10 percentile to the 90 percentile values, there is deducible the nature of the size and distribution of the finer particles in said formation. There is then established relative to said distributional curve a similar curve, identified as B, which is at all points normally greater in size than that of the formation sand curve; the 50% or median diameter of all the particles on curve B may be as much as 8 times the median diameter, indicated by point $g$ on curve A, representing the formation. Additionally, it will be noted that curve B has a slope between the 10 percentile and the 90 percentile values such that the ratio of the particle diameters at these two points is at least 3:1.

Further, in accordance with the invention, I have found that the ratio of 90 percentile diameters should not be greater than about 12:1; the latter restriction is of considerable importance in that it substantially controls the degree of movement of the finer particles, comprising the silt, clay and minute sand portions of the original formation. A ratio greater than about 12 at the 90 percentile for the sand pack permits undue movement of said fine particles out of the producing sand and into the sand pack so that the holding power of the sand pack on said fine particles is effectively reduced.

With the sand particles well graded and mixed as discussed hereinabove, the particles are added to a liquid vehicle, such as an oil or a saturated brine. This mixture is then introduced into the well bore under conditions of turbulence so that all of the particles are maintained in suspension and desirably with the same amount of mixing as when introduced. Where the fluid cannot be pumped under conditions of turbulence, it may be necessary to use a more thixotropic fluid that will suspend the particles therein.

Figure 1:
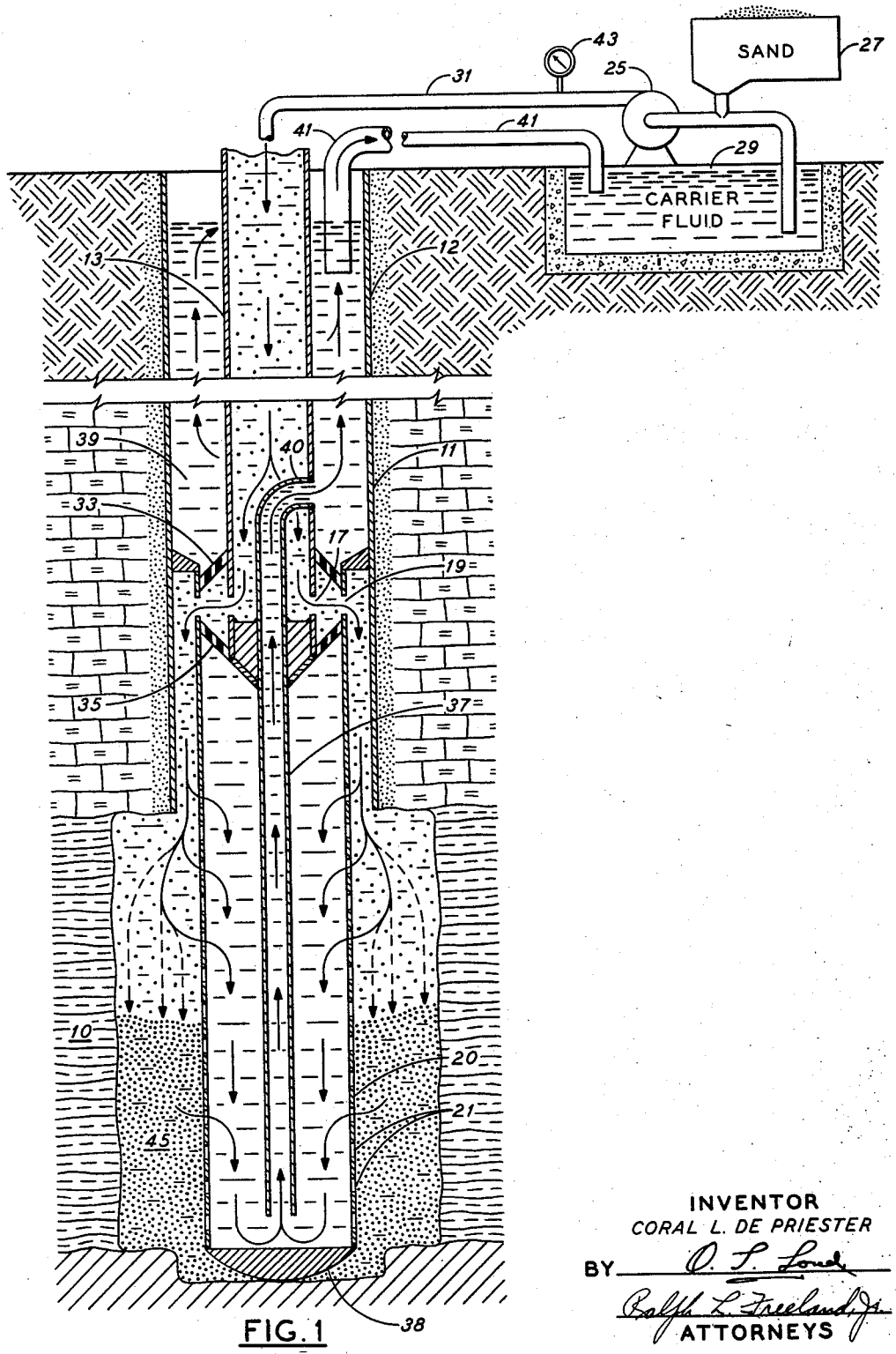
Fig. 1 is a schematic representation of one method of injecting a wide size-range sand in accordance with the invention into an earth formation behind a slotted liner.

The carrier fluid, including the widely graded sand particles, is then injected, as shown in Fig. 1, through tubing 13 and flows downwardly to the control ports 17 between upper swab cups 33 and lower cups 35 opposite ports 19 in the top of producing liner.

As further indicated schematically in Fig. 1, after selection of the proper particle sizes, the sand and fluid can be mixed by pump 25 combining sand from tank 27 with carrier fluid from tank 29 as it is supplied to tubing 13 through pipeline 31. The rate of pumping is controlled to maintain the mixture in sufficient turbulence until the mixture enters the annular space between the perforations 21 in liner 20 and the underreamed part of borehole 11. This flow scheme is indicated by flow arrows. The sand particles in a thoroughly-mixed state are then deposited as pack 45 between liner 20 and the well bore wall of unconsolidated formation 10 by the fluid carrier flowing back to the surface through perforations 21 and into the lower end of tail pipe 37. From tail pipe 37 the fluid flows into the annular space 39 between tubing 13 and casing 12 through cross-over connection 40, and is returned for reuse, if desired, to tank 29 by line 41. After installation of pack 45 the ports 19 are closed by rotating tubing 13 and operation of closing mechanism not shown in detail. As shown, the bottom of liner 20 is closed with a bull plug 38.

In general, the completion of the sand pack behind the perforations of liner 20 is indicated at pressure gauge 43 by an increase of pump pressure in supply line 31. This pressure rises due to the restriction in flow area in the smaller annular space above perforated liner 20 and the packing off of perforations or holes 21. As a preferred method of installing sand pack 45, this increase in pressure is used to advantage by permitting it to rise to a predeterminable extent. Thus, sufficient pressure is applied by pump 25 at the surface to force the carrier fluid and sand into firm engagement with the formation 10. Desirably pack 45 is made as solid as possible so that the granular particles force themselves into binding engagement with the particles of the formation.

In the present embodiment, liner 20 is shown as having precut slots 21 that have a rectangular area permitting flow communication between the outside and inside of the liner. Alternatively, the liner 20 may be formed as a screen, or may have slots cut in the liner after it is positioned as shown in Fig. 1. Under any of these circumstances, the smallest dimension of any of the openings is selected in accordance with the diameter of the particles used in the sand pack, as above described. Desirably, this smallest dimension is chosen to be not greater, and preferably less, than the dimension at the 10 percentile value. For well maximum productivity, said liner openings, or slots, are made as near maximum in number and extent as practical, but such that structural strength of the liner is not detrimentally impaired. With a conventional slotted liner, theoretical studies indicate that if slots cover 3% of the total area of the liner, the the liner will provide over 90% of the available open formation productivity, assuming that the well walls would not break down with the fluid flow. In practice, however, more total open area is often desirable because some of the slots may be plugged by mud filter cake during installation, or by deposition of waxes, asphalts, carbonates or other solutes present in produced fluids.

While the installation of the sand pack in accordance with the foregoing specification has been described as though the well were being completed as a new producing well, it is obvious that in many fields the necessity for sand packing and sand control becomes apparent only after a well has been placed on production. Hence, the sand pack will often be installed as a remedial measure. Under these conditions, the well has usually sloughed considerable sand from the formation walls and reworking thereof is required. In such circumstances, it is preferable to re-enter the hole and underream using a drilling fluid appropriate to the type of the formation. Generally, this will be a low filter loss, thin filter cake mud, such as oil or oil-base mud. Following such redrilling, the widely graded sand particles are thoroughly dispersed in a carrier fluid, such as crude oil and pumped into the annulus behind the preset liner. A 50 centipoise crude oil, for example, has been used.

There are given below two examples of the application of the present method to widely different field conditions. The first of these was in the East Coalinga field, Bakersfield County, California, and the second was in the Bay Marchand field, offshore from Louisiana.

*Example I*

Well 28—25A in the East Coalinga field, Bakersfield County is a production well in a field being water flooded. It had been repaired and treated several times to prevent plugging off by sand movement during production.

Figure 3:
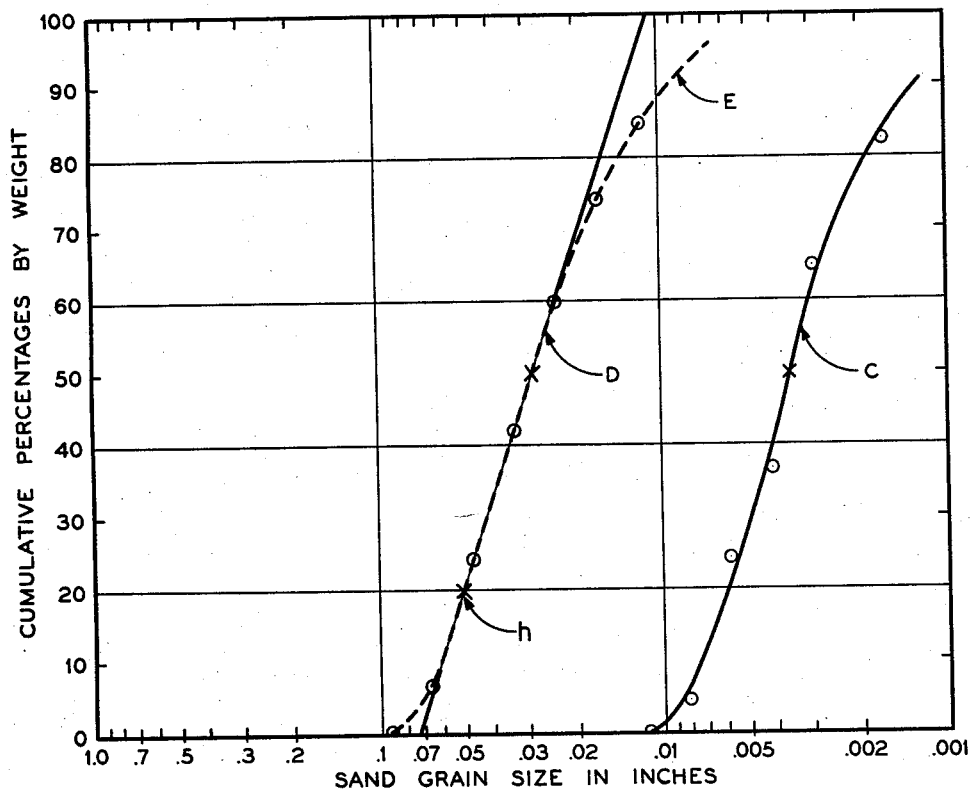
Fig. 3 is a particle size distribution curve similar to Fig. 2 used in selecting packing sand for a well bore in California.

The particle sizes for sand packing were determined by screen analysis of bailings from materials sloughed into the borehole. Curve C in Fig. 3 represents the percentile distribution of grain size determined by said analysis. Line D represents the screen analysis of the largest sized mixture of sand particles suitable for the pack. Curve E represents the sand actually used in accordance with the present invention for packing the producing formation behind a wire-wrapped screen. The slot width of the openings in said screen was specified to be 0.050 inch. This opening in a wire-wrapped design gives a total slot area of 28.5% of the surface area available on the liner, which was a section of 4½ inch O.D. slotted, seamless casing, covered with stainless steel wire.

Selection of the particle sizes in the present example was made by using sand particles whose median diameter was eight times the diameter of the median of the bailings analyzed. As indicated by point $h$ on cruve E, the slot width was selected to be about the 20 percentile diameter of the pack sand.

Since the present well was a re-completion of a producing well, the producing formation was underreamed using an oil base mud that minimized filter cake formation and reduced the possibility of formation damage. Additionally, the formation was acidized before insertion of the sand pack to assure against formation plugging by carbonates, or other materials removed or modified to increase permeability by acid action prior to sand packing. The sand pack was then completed substantially in accordance with the method outlined in the description of Fig. 1. The fluid vehicle for depositing the mixture of silica aggregate sands, of the prescribed wide-range particle sizes, was a 50 centipoise crude oil.

Following re-completion of the well in accordance with the present invention, average 30 day production of the well was 24/22 barrels per day of 20° API crude and water. Previous production had averaged 3/11 barrels per day. Following a further period of testing, and other stimulation, involving washing of the well both into and out of said sand pack and into the formation, production was increased to 30/140 BPD oil and water. During all of this time no sand production occurred.

Example II

Louisiana State well 1367 0-1, in the Bay Marchand field, offshore from Louisiana, was completed as a development well in a horizon at the 4600 ft. depth. This formation is one of a series of dirty, unconsolidated Miocene sands, interbedded with silt, clay and mudstone layers. Many different methods of sand control known in the industry had been tried unsuccessfully, including packing with uniform gravel sizes sufficiently small to qualify as sand. No method had been successful in eliminating sand production, while still giving adequate productivity. Desanding of wells was a regular and continuing operation in this particular field.

Figure 4:
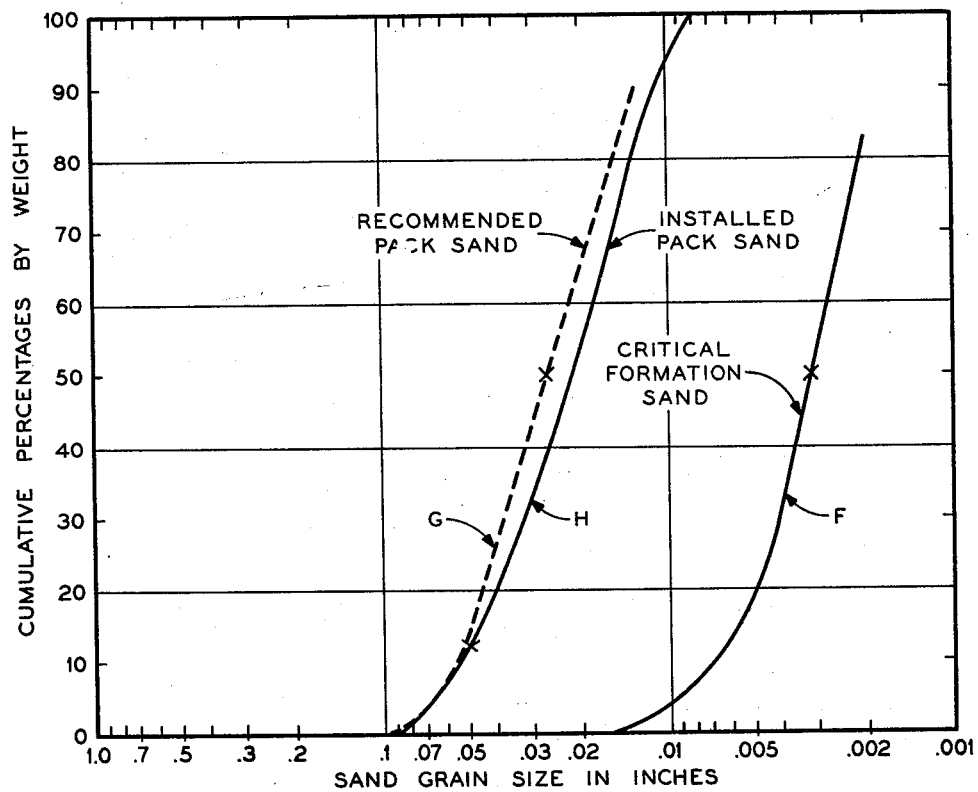
Fig. 4 is another particle size distribution curve similar to Figs. 2 and 3 used to select a packing sand for a well bore in a Gulf Coast offshore field.

The sand pack in the present example was determined in the manner illustrated in Fig. 4, wherein curve F was found by analysis of cores taken during initial drilling of this development well. The selection of particle sizes was specified to be not greater than the dotted line G in Fig. 4, but due to unavailability of a single sand in South Louisiana, corresponding to the prescription of the present invention, a composite mixture of sands was used in this installation, with the size distribution shown as curve H.

Due to the problem of completing any well in this type of loosely consolidated formation, a casing was set and cemented immediately after the drilling was completed. The drilling fluid was then changed to sodium chloride saturated sea water, and the proper interval opposite the producing formation was gun perforated with 12 one-half inch holes per foot. Sand particles in accordance with the selection indicated in curve H were then run into the well by an open-ended tubing and the sand squeezed through said perforations under a pressure of between 1500 and 2000 pounds per square inch. The casing was then cleaned by reverse circulation and a liner having a standard slot pattern of 0.050 inch width in a 2⅞ inch of O.D. tubing run into the hole. This slot opening corresponds to about the 14 percentile value of the actual pack sand. The packing sand was then introduced into the space between the slotted liner and the perforated casing by flowing brine-sand slurry down the tubing casing annulus and flowing de-sanded brine back to the surface through tubing. The vehicle fluid for the sand particles was a saturated salt water. Since completion of the well in the foregoing manner, it has flowed its maximum, Louisiana State allowable rate of 178 barrels per day, with no sand production.

In the foregoing examples, as well as the detailed description of the preferred method of installing a pack of particulate material having a wide range of sizes selected in accordance with the size of particles comprising the producing formation, it will be understood that there is provided by the present invention a method of preventing sand production, while maintaining maximum permissible flow of the desired production fluids under high-differential pressure conditions between the well bore and the producing formation.

Various modifications and changes, particularly in the method of installing a pack of particulate material, such as sand, will become apparent from the foregoing detailed description. All such modifications and changes therein, as well as in the method of selecting said wide-range of particle sizes that fall within the scope of the appended claims are intended to be included therein.

I claim:
1. The method of preventing movement of sand particles from an earth formation containing said sand in an unconsolidated state when the fluids in said formation are subjected to a high pressure differential in the neighborhood of a well bore passing through said formation by packing against the walls of said well bore a pack mixture of particles having a distribution of sizes extending over a range similar to the distribution of sizes present in said earth formation comprising the steps of sampling said earth formation in said neighborhood of said well bore, analyzing said sample to determine said distribution of sand particle sizes of at least the 10 percentile, 50 percentile and 90 percentile sizes of the particles present in said earth formation, selecting a distribution of size graded particle material for said pack in accordance with said analysis such that each of said percentile size grade selections in said pack distribution of sizes is present in a weight percentage approximately equal to the weight percentage of a size grade of the formation and with the 50 percentile median particle size of said pack mixture of particles being not more than eight times the 50 percentile median particle size present in said earth formation, the 10 percentile particle size of said pack mixture of particles being not less than three times the 90 percentile particle size of said pack mixture of particles, and the 90 percentile particle size of said pack mixture of particles being not more than twelve times the 90 percentile particle size present in said earth formation, mixing said selected size graded particles to substantially the same degree as in said earth formation, and positioning said pack mixture between said earth formation and a retaining liner having sufficient strength to withstand crushing when a fluid pressure drop is exerted on said liner under conditions of production into the well, said liner having perforations therein for restraining the flow of said particles of said pack mixture, the controlling dimension of said perforations for passage of pack particles being not greater than the smallest particle in the 10% by weight of said pack mixture containing the largest size of pack particles.

2. The method of preventing movement of sand particles from an earth formation containing said sand in an unconsolidated state when the fluids in said formation are subjected to a high pressure differential in the neighborhood of a well bore passing through said formation by packing against the walls of said well bore a pack of graded particles, which comprises the steps of sampling said earth formation in said neighborhood of said well bore, analyzing said sample to determine at least the 10 percentile, 50 percentile and 90 percentile particle sizes of sand particles present in said earth formation, selecting at least three different sizes of graded particle materials for said pack related to each other in size in accordance with said formation analysis such that a percentile particle size analysis of said pack at substantially the same percentile sizes as said formation analysis would be at each percentile size larger than the same percentile size in said earth formation and with the median particle size of said pack mixture being not greater than 8 times the median particle size present in said earth formation, the smallest particle size of said selected graded particle materials being not greater than 12 times the 90 percentile particle size present in said earth formation, and the largest particle size of said selected graded particle materials being not less than three times said smallest particle size, mixing said selected size graded particles to substantially the same degree as in said earth formation, inserting in the well bore a retaining liner having sufficient strength to withstand crushing when said high pressure differential is exerted through said liner under conditions of production into the well, said liner having perforations therein for restraining the flow of said pack of graded particles, the controlling dimension of said perforations for passage of pack particles being not greater than the smallest particle in the 10% by weight of said pack of graded particles containing the largest size of pack particles, and positioning said mixed pack of graded particles between said earth formation and said retaining liner.

3. The method in accordance with claim 2 including the additional steps of underreaming the earth formation to be packed prior to the step of positioning said sand pack mixture of sand particles, circulating a low filter cake depositing mud while underreaming said formation, suspending said sand particles as a pack mixture in a fluid vehicle, and pumping said fluid vehicle into the space between the well liner and the underreamed earth formation under sufficient pressure to compact said sand pack mixture.

4. The method of preventing movement of sand particles from an earth formation containing said sand in an unconsolidated state when the fluids in said formation are subjected to a high pressure differential in the neighborhood of a well bore passing through said formation by packing against the walls of said well bore a pack of graded particles, which comprises the steps of sampling said earth formation in said neighborhood of said well bore, analyzing said sample at a sufficient number of by weight percentile sizes to determine the gradation of sizes of particles present in said formation, selecting a plurality of size graded particle materials for said pack with the smallest selected particle being not greater than 12 times larger than the formation particles at about the 90 percentile size and with the other selected size graded particle materials having a percentile size relationship to each other and to said smallest selected particle substantially in accordance with the percentile relationship of particle sizes present in said formation, each selected size graded particle being of larger size than the formation particle at the corresponding formation percentile size, mixing said selected size graded particles to substantially the same degree as in said earth formation, inserting in said well bore a retaining liner having sufficient strength to withstand crushing when said high pressure differential is exerted through said liner under conditions of production into the well, said liner having perforations therein for restraining the flow of said pack of graded particles, the controlling dimension of said perforations for passage of pack particles being not greater than the smallest particle in the 10% by weight of said pack of graded particles containing the largest size of pack particles, and positioning said mixed pack of graded particles between said earth formation and said retaining liner.

5. The method of preventing movement of formation sand particles into a well bore from an earth formation containing said particles in an unconsolidated state when the fluids in said formation are subjected to a high pressure differential in the neighborhood of said well bore passing through said formation by packing against the walls of said well bore a pack mixture of particles, which comprises the steps of sampling said earth formation in said neighborhood of said well bore, analyzing said sample to determine the distribution of sand particle sizes of at least the 10 percentile and 90 percentile sizes of the particles present in said earth formation, selecting a distribution of size graded particle material for said pack in accordance with said analysis such that the 90 percenitle particle size of said pack mixture is between 1 and 12 times the 90 percentile particle size present in said earth formation, the 10 percentile particle size of said pack mixture is not less than three times the 90 percentile particle size of said pack mixture, and the relative gradation of particle sizes of said pack mixture between the 90 percentile particle size and the 10 percentile particle size is substantially similar to the relative gradation of particle sizes present in said earth formation, mixing said selected size graded particles to substantially the same degree as in said earth formation, inserting into the well bore a retaining liner having sufficient strength to withstand crushing when a fluid pressure drop is exerted on said liner under conditions of production into the well, said liner having perforations therein for restraining the flow of said particles of said pack mixture, the controlling dimension of said perforations for passage of pack particles being not greater than the smallest particle in the 10 percentile size selection for said pack mixture, and positioning said pack mixture between said earth formation and said retaining liner.

6. The method of preventing movement of sand particles from an earth formation containing said sand in an unconsolidated state when the fluids in said formation are subjected to a high pressure differential in the neighborhood of a well bore passing through said formation by packing against the walls of said well bore a pack mixture of particles, which comprises the steps of sampling said earth formation in said neighborhood of said well bore, analyzing said sample to determine said distribution of sand particle sizes of at least the 10 percentile, 50 percentile and 90 percentile sizes of the particles present in said earth formation, selecting a distribution of size graded particle material for said pack in accordance with said analysis such that the percentile size grade selections in said pack distribution of sizes is at each of said values larger than the corresponding percentile particle size in said earth formation and the 90 percentile particle size of said pack mixture is not greater than 12 times the 90 percentile particle size present in said earth formation, the 50 percentile median particle size of said pack mixture is not greater than 8 times the 50 percentile median particle size present in said earth formation, and the relative gradation of selected particle sizes of said pack mixture between smallest particle and largest particle is substantially similar to the relative gradation between smallest particle and largest particle in said analyzed earth formation, mixing said selected size graded particles to substantially the same degree as in said earth formation, inserting in the well bore a retaining liner having sufficient strength to withstand crushing when a fluid pressure drop is exerted on said liner under conditions of production into the well, said liner having perforations therein for restraining the flow of said particles of said pack mixture, the controlling dimension of said perforations for passage of pack particles being not greater than the smallest particle in the 10% by weight of said pack mixture containing the largest size of pack particles, and positioning said pack mixture between said earth formation and said retaining liner.

7. The method of preventing movement of sand particles from an earth formation containing said sand particles in an unconsolidated state when fluids in the formation are subjected to a high pressure differential adjacent a well bore passing through said formation, which comprises sampling the earth formation adjacent the well bore, analyzing said sample to determine the range and distribution of particle sizes of the earth formation sand, inserting a retaining perforated liner into the well bore and packing the space between the liner and the wall of the well bore with a packing sand having a range of particle sizes generally similar to the range of particle sizes characterizing the formation sand, the particle sizes of the packing sand at any selected part of the packing sand size range being greater, but not more than about 8 times greater, than the particle sizes of the formation sand in the corresponding part of the formation sand size range, and the 10 percentile median particle size of the packing sand being at least 3 times the 90 percentile median particle size of the packing sand.

8. In a well bore having a perforated liner extending vertically at least throughout a producing formation subject to sand movement out of said formation and into the well bore under producing conditions wherein a high pressure differential exists between the well bore and said producing formation, the improvement which comprises a pack of particle material between said liner and said producing formation proportioned to the character of sand grain sizes comprising said producing formation, wherein the particle size at the 50 percentile median value of said pack material is between 1 and 8 times the grain size at the 50 percentile median value of said formation, the particle size at the 90 percentile value of said pack material is between 1 and 12 times the grain size at the 90 percentile value of said formation, the particle size at the 10 percentile value of said pack material is not less than 3 times the particle size at the 90 percentile value of said pack material, and wherein said pack material is mixed to substantially the same degree of mixing as the grain material in said producing formation.

References Cited in the file of this patent

UNITED STATES PATENTS

| | | |
|---|---|---|
| 2,198,573 | Davis et al. | Apr. 23, 1940 |
| 2,674,323 | Cardwell | Apr. 6, 1954 |